United States Patent

Kremer et al.

Patent Number: 5,921,297
Date of Patent: Jul. 13, 1999

[54] DEVICE FOR AND METHOD OF ROBOTIZABLE REFUELLING OF A VEHICLE

[75] Inventors: Adolf Kremer, Remseck; Dieter Scheurenbrand, Wolfschlugen; Reinhard Steinkämper, Winnenden, all of Germany

[73] Assignee: Daimler-Benz Aktiengesellschaft, Stuttgart, Germany

[21] Appl. No.: 09/038,690

[22] Filed: Mar. 9, 1998

[30] Foreign Application Priority Data

Mar. 7, 1997 [DE] Germany ................ 197 09 416

[51] Int. Cl.⁶ .................................................. B65B 1/04
[52] U.S. Cl. .................. 141/383; 141/301; 220/86.2; 220/DIG. 33
[58] Field of Search .................. 141/291, 292, 141/312, 301, 346, 348–350, 367, 368; 220/86.2, DIG. 33

[56] References Cited

U.S. PATENT DOCUMENTS

| 5,232,028 | 8/1993 | Sunderhaus et al. ................ 141/301 |
| 5,725,033 | 3/1998 | Steinkaemper et al. ............ 141/312 |
| 5,730,194 | 3/1998 | Foltz ........................................ 141/301 |

FOREIGN PATENT DOCUMENTS 19532774   7/1996   Germany .

Primary Examiner—Steven O. Douglas
Attorney, Agent, or Firm—Evenson, McKeown, Edwards & Lenahan, PLLC

[57] ABSTRACT

A device for robotizable refuelling of a vehicle includes a docking component which can be installed on a filling tube of a fuel tank of the vehicle for receiving a pistol nozzle, in which the pistol nozzle can be locked, in axial and peripheral directions, and which has a central passage for a fill pipe of the pistol nozzle. The device contains a hollow cylindrical ring carrier element provided with a central passage fastened on an underside of the docking element. A locking ring provided with radially projecting bayonet arms is held against torsion but axially moveable on the ring carrier element. A compression spring is braced between the underside of the locking ring on the one hand and a connection of the ring carrier element. The device can be installed on the edge of the filling tube, which is provided with recesses for passage of bayonet arms of the locking ring at an inlet side to form a bayonet lock. In order to make secure refuelling possible in a simple manner, the ring carrier element carries a coupling ring arranged torsion fast on the filling tube lying on top of the locking ring. Stop structures corresponding to each other are defined on an upper side of the coupling ring and on the underside of the docking element so that the docking element can be fixed on the coupling ring.

19 Claims, 3 Drawing Sheets

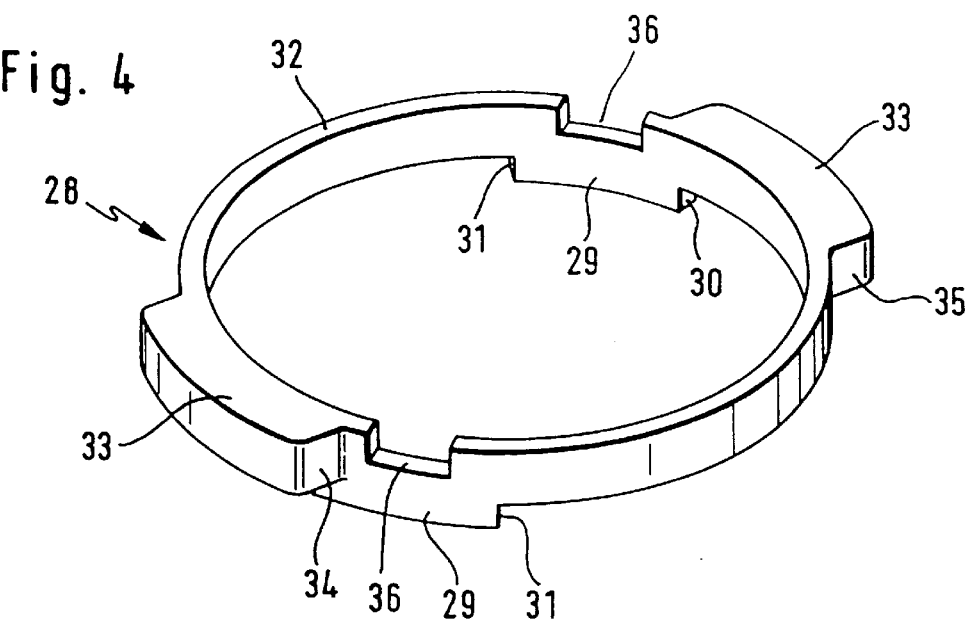
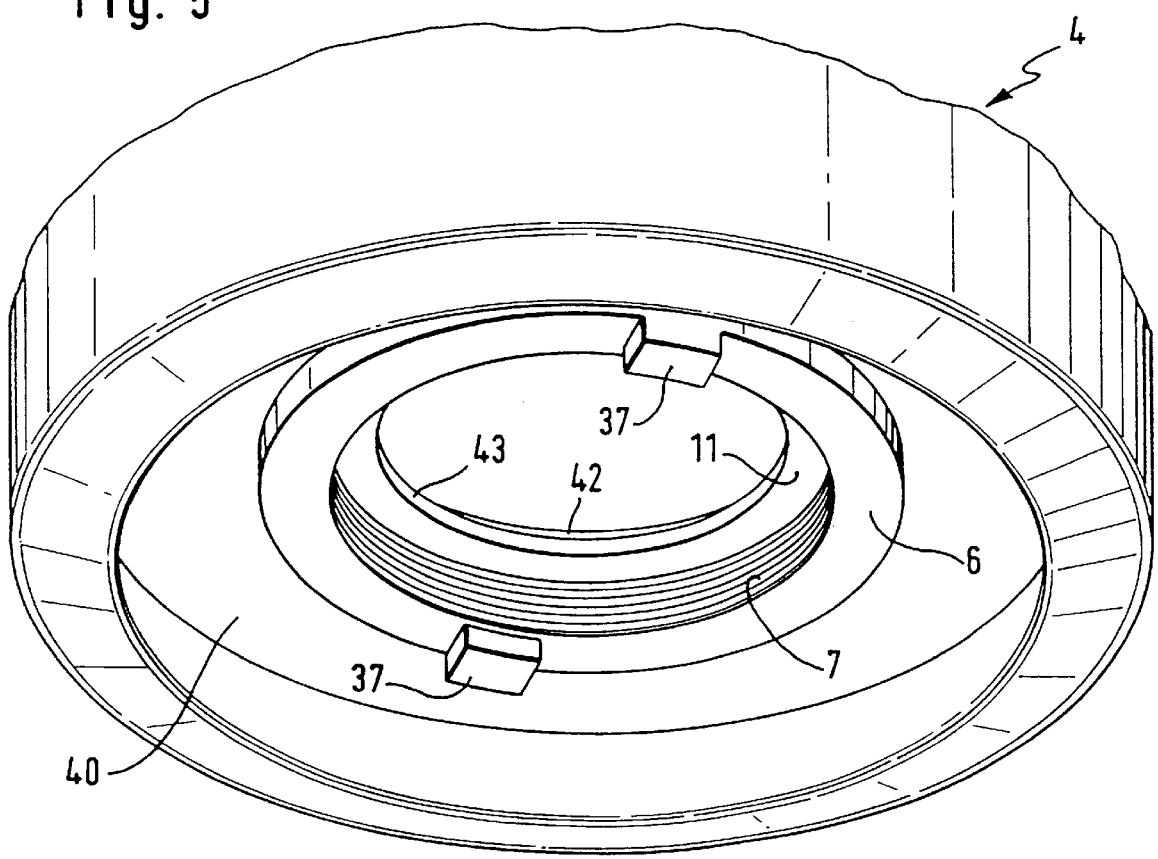

5,921,297

DEVICE FOR AND METHOD OF ROBOTIZABLE REFUELLING OF A VEHICLE

BACKGROUND AND SUMMARY OF THE INVENTION

This application claims the priority of German application No. 19709416.3-13, filed Mar. 7, 1997, the disclosure of which is expressly incorporated by reference herein.

This invention concerns a particularly constructed device for robotizable refuelling of a vehicle.

A device of this type is known from German patent publication DE 195 32 774 C1. The refuelling arrangement described in this publication includes a docking element which has a basically circular central recess for accommodating a pistol nozzle. The docking element has a peripheral inner gearing into which an outer gearing on the pistol nozzle engages while docking. The docking element and the pistol nozzle form two docking partners which are locked in a peripheral direction. For locking in an axial direction, at least one locking element is installed on the pistol nozzle which engages in an annular space below the inner gearing in the docking position. The docking element includes two annular elements which are arranged upon each other. The lower annular element is fastened on the filling tube of the motor vehicle tank and the upper annular element is pivoted on the lower annular element. An attachment of the lower annular element is created in a bayonet lock on the retracted edge of the filling tube. For this purpose, a hollow cylindrical ring carrier element provided with a central passage is fastened by a clip connection which supports a locking ring provided with radially projecting bayonet arms.

A compression spring is braced between a connection formed on the free end of the ring carrier element and the bayonet arms of the locking ring. The locking ring is held rotation-proof within certain limits owing to the load of the compression spring, but nonetheless remains axially movable. For fastening the docking element, the ring carrier element is inserted into the filling tube. The bayonet arms of the locking ring are passed through appropriate recesses in the recessed edge of the filling tube.

After installation of the lower annular element on the filling tube, the docking element is rotated in a peripheral direction, after which the bayonet arms are led along a ramp-like groove on the underside of the edge of the filling tube running in a peripheral direction and connecting with the recesses in a peripheral direction up to a catch. The bayonet arms are then clamped in the groove in the form of a bayonet lock. Upon docking, the robot nevertheless executes certain rotations relative to the vehicle, for example, on the part of the robot. These rotations are performed in order to lock or unlock the pistol nozzle in the docking element, or in order to swing the lid held on the docking element horizontally. Rotations likewise occur when the vehicle is shifted into the docking position when the vehicle occupants get in or out. These rotary motions can lead to the docking element, together with the docked pistol nozzle, being twisted against the locking direction of the bayonet locking so that a loose locking or, at worst, an unlocking of the docking element at the filling tube occurs. The tank filling is thus interrupted in a most undesirable manner. Attaching the docking element inseparably to the filling tube during vehicle assembly to eliminate this defect is conceivable. The docking element, however, should be capable of being retrofitted in used vehicles. Additionally, refuelling at usual dispensing pumps must continue to be possible. Consequently, the docking element must remain capable of being dismounted in connection with the latter, as simply as possible, and with a reasonable expenditure of energy.

It is a primary object of this invention to refine a device representative of this type such that safe filling of a vehicle fuel tank is made possible in a secure manner.

This object is accomplished by providing a particular device for robotizable refuelling of a vehicle. The device includes a docking element which can be installed on a filling tube of a vehicle fuel tank for accommodating a pistol nozzle, in which the piston nozzle can be locked in an axial and peripheral direction, and which has a central passage opening for a fill pipe of the piston nozzle. A hollow, cylindrical ring carrier element is fastened underneath the docking element and provided with a central passage. A locking ring is held, without torsional movement but axially movable, on the carrier element. A compression spring is braced between an underside of the locking ring and a connection of the ring carrier element. Radially projecting bayonet arms are provided on the locking ring by which the device can be installed on an inlet edge of the filling tube. The edge of the filling tube is provided with recesses for guiding the bayonet arms through to provide a bayonet closure.

A coupling ring borne by the ring carrier element is arranged torsion fast (against rotation) on the upper side of the locking ring. Catch elements, constructed so as to correspond to each other, are defined on an upper side of the coupling ring and on an underside on the docking element. The docking element can be engaged by these catch elements with the coupling ring.

The invention assures safe refuelling in a simple manner by providing a coupling ring between the underside of the docking element and the locking ring. Although the coupling ring is inherently capable of rotation, it is arranged to rotate with the filling tube in the fitting position of the docking element. The docking element is subsequently fixed on the coupling ring by rotating the docking element in relation to the coupling ring. The docking element is secured in the peripheral direction in this way. owing to this torsion-proof arrangement of the coupling ring and the torsion-proof arrangement of the docking element peripherally (likewise attained by fixing the docking element in the coupling ring), a rigid connection of the docking element with the filling tube is brought about in a peripheral direction. The rigid connection can be released when needed since the fixation of the docking element can be eliminated by manual, axially directed traction. Consequently, the torque acting on the docking element is absorbed without being transmitted to the locking ring for a possible unlocking of the docking element.

BRIEF DESCRIPTION OF THE DRAWINGS

The invention is explained below in greater detail on the basis of an embodiment represented in the drawings.

FIG. 4 is a perspective view of a coupling ring.

FIG. 5 is a perspective view of an underside of the docking element.

DESCRIPTION OF THE PREFERRED EMBODIMENT

Figure 1:
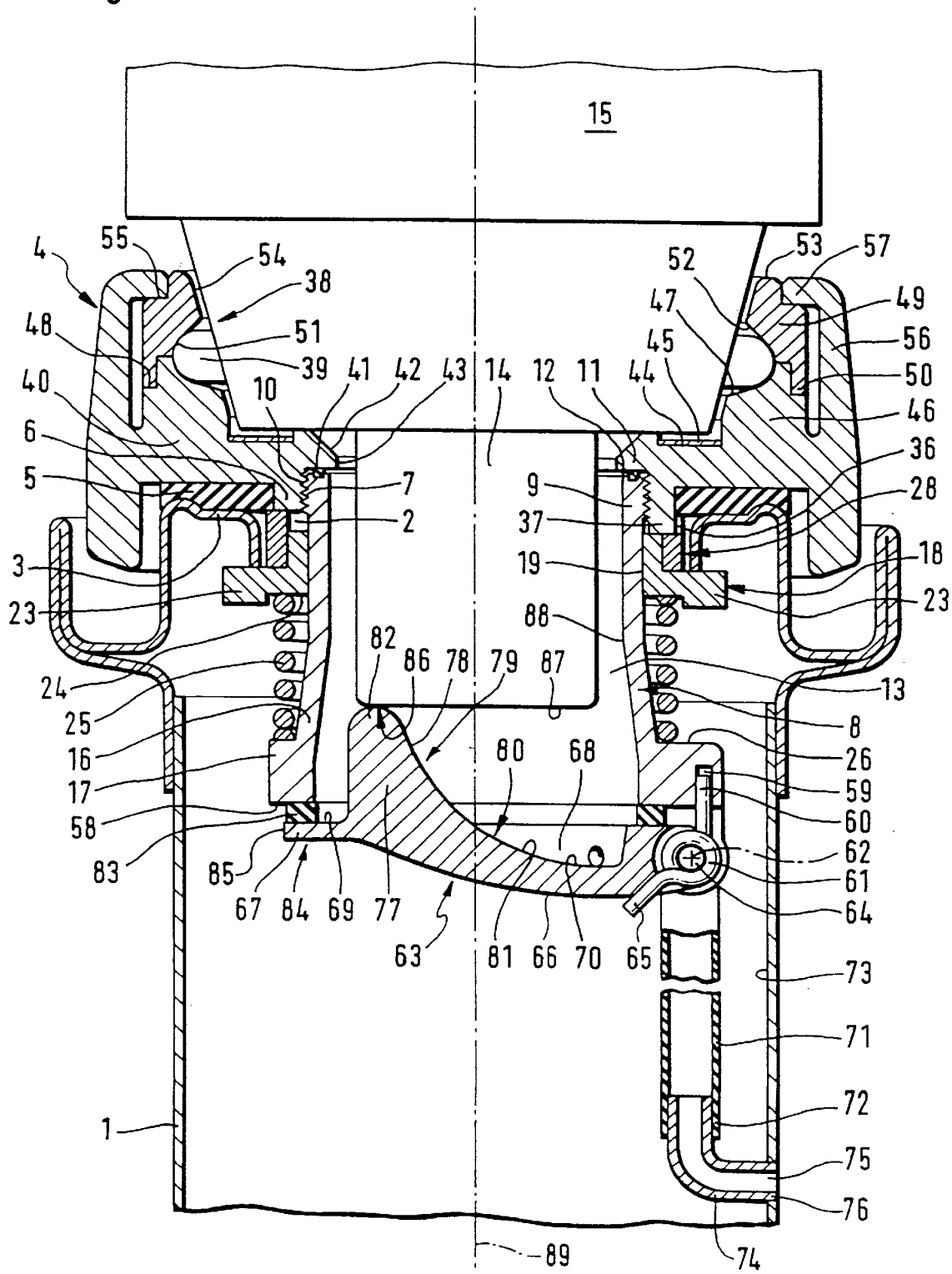
FIG. 1 is a view of the device of the invention in a lateral section with a pistol nozzle in the docking position.

The filling tube 1 of a fuel tank of a motor vehicle is represented in FIG. 1. The filling tube 1 possesses a retracted edge 3 delimiting a mouth opening 2. A docking element 4 is installed over the opening and seals the edge 3 of the filling tube 1 through a flat ring seal 5 mounted on a side of the docking element. The flat ring seal 5 surrounds a ring connection tip 6 extending concentrically on the docking element 4 and projecting downwardly.

The ring connection 6 has, in its interior, an inner thread 7 into which an elongated hollow cylindrical ring carrier element 8 is screwed. The carrier element 8 possesses an appropriate outer thread 10 on its upper end 9. The end 9 is tightly sealed at its upper side on a ring-shaped shoulder 11 of the docking element 4 which projects inwardly. An O-ring 41 is embedded in the face 12 of the upper end 9. In the attachment position of the device on the filling tube 1, the ring carrier element 8 dips into the filling tube 1 through the mouth opening 2. The ring carrier element 8 possesses a central passage 13 for a fill pipe 14 of a pistol nozzle 15 docked on the docking element 4. The pistol nozzle can be manually or robotically guided for filling the motor vehicle tank. A ring connection 17 extending radially toward the outside is provided at the lower end 16 of the ring carrier element 8. This lower end 16 is slightly widened conically.

Figure 2:
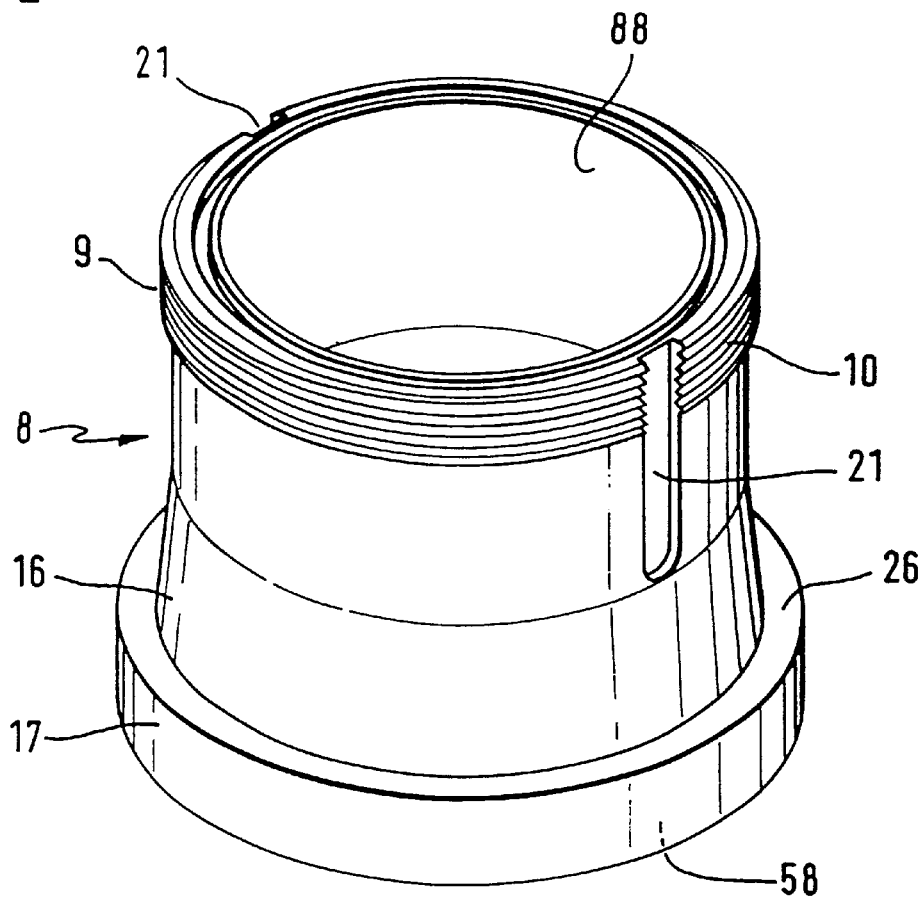
FIG. 2 is a perspective view of a ring carrier element.
Figure 3:
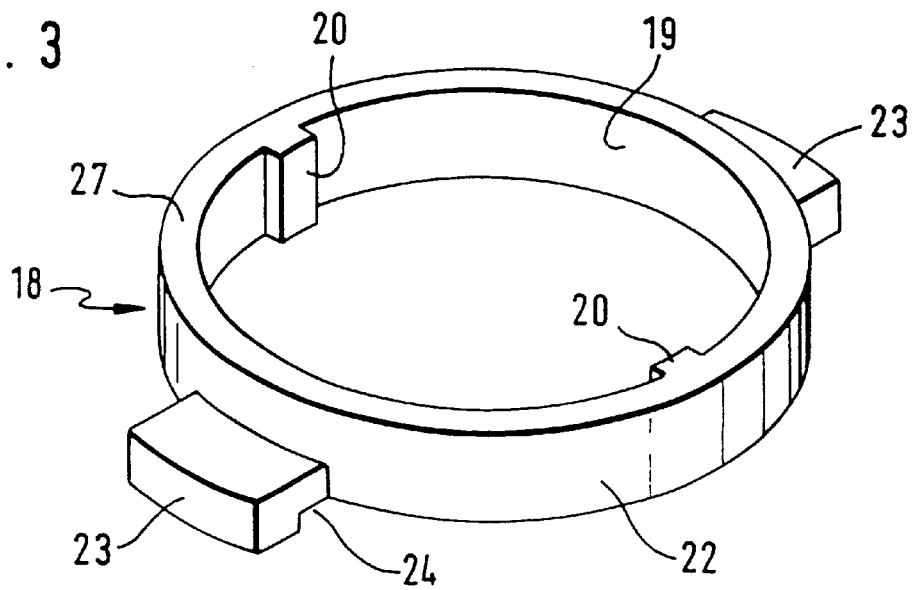
FIG. 3 is a perspective view of a locking ring of the docking element.

The ring carrier element 8 bears a locking ring 18 which has two retaining bars 20 extending radially inward and diametrically opposite each other (FIG. 3). These retaining bars 20 engage in two longitudinal grooves 21 (FIG. 2) of the ring carrier element 8 so that the locking ring 18 is held fast in a rotational direction on the docking element 4. The longitudinal grooves 21 are constructed so as to open upwardly for receiving the retaining bars 20 of the locking ring 18 when assembling the device. The locking ring 18 possesses two opposing radially projecting bayonet arms 23, displaced about 90° in the peripheral direction from the retaining bars 20, which are stepped downward from the upper side 27 of the locking ring 18. A recess 24 near the ring is provided on the underside of each bayonet arm 23.

In these recesses 24, a compression (coil) spring 25 is braced so as to be shift-proof in a radial direction. The spring 25 surrounds the ring carrier element 8 concentrically and lies on the upper side 26 of the ring connection 17 as a "counter catch" or spring seat. The locking ring 18 is axially movable in the longitudinal grooves 21 under spring tension.

A coupling ring 28 (FIG. 4) stands on the bayonet arms 23 which surround the locking ring 18 concentrically, and with little play, in order to save construction space. The coupling ring 28 has, on its underside, two diametrically opposed catch segments 29 projecting toward the tank interior and having facing sides 30, 31 which form catch rims for the bayonet arms 23 of the locking ring 18 with a relative rotation of the locking ring 18 toward the coupling ring 28 for locking the device on the filling tube 1 in the docking position. The coupling ring has catch segments 29 overlapping radial shoulders at the upper side 32 of the coupling ring 28 clockwise, which cover the catch rims 30 pointing clockwise. The shoulders 33 are likewise diametrically opposed, and are arranged in the fastening position of the docking element 4 on the filling tube 1 for protecting the coupling ring 28 against torsion within bayonet recesses of the filling tube edge 3. The recess ends form the catches for the shoulder faces 34, 35.

Stop structures are constructed on the upper side of the coupling ring 28 in the form of two diametrically opposed stop grooves 36. These stop grooves 36 correspond to structures defined on the underside on the docking element 4. The structures on the underside of the docking element 4 project toward the coupling ring 28 and have the form of rigid stop lugs 37 (FIG. 5) for fixation in the grooves 36, and consequently provide fixation of the docking element 4 with the coupling ring 28. More than two stop resources can also be arranged in any given case on the docking element 4 and on the coupling ring 28. In this way, even smaller rotations are necessary to reach a fixation. The stop lugs 37 can also be vertically displaceable, for example under spring tension in a guide boring. The stop grooves 36 are preferably situated directly above the catch segments 29. As a result, the stability of the ring 28 is least impaired by incorporation of the groove 36 owing to the increased material accumulation. The stop lugs 37, moreover, extend from an underside of the ring connection 6 of the docking element 4.

The docking element 4 possesses a bipartite stop receptacle 38 in which radially mobile counter form locking elements 39 of the pistol nozzle 15 can be engaged so that interlocking takes place axially and radially on the docking element 4. The bipartite character of the stop receptacle 38 permits it to be made economically of light plastic without further question. A single part construction is very problematic in terms of manufacturing technology with respect to axial locking and the necessary undercut associated with it in connection with plastics.

The base 40 likewise contains the ring-like shoulder 11 which has a circular bevel 42 on its interior 43 for centering the fill pipe 14 of the pistol nozzle 15 when it is inserted into the device. A ring-shaped recess 44 is incorporated into the base 40 and connects radially to the shoulder 11 toward the outside. A reflector ring 45, which corresponds with a sensor of the tank robot for correct docking of the pistol nozzle 15 on the docking element 4, is fastened in the recess 44.

Radially further toward the outside, an elevated section 46 of the base 40, serving as a ring bearing, is connected to the recess 44. The elevated section 46 is constructed "form negative" on its interior 47 (vaulted in the illustrated embodiment) in relation to a lower part of the counter form locking elements 39 of the pistol nozzle 15. The section 46 carries these locking elements 39 in the docking position of the pistol nozzle 15. On the outside, the ring bearing has a ring-like shelf 48 on which an adapter ring 49, forming the upper part of the stop receptacle 38, is supported with a form negative step 50 projecting downward. In this way, the adapter ring is held radially secure against loss.

The interior 51 of the adapter ring 49 is constructed form negative corresponding to an upper part of the counter form locking elements 39. A circular inclined ramp 52, facing the base 40, connects upwardly and permits the counter form locking elements 39 to slip out of the stop receptacle 38 in the event of an emergency dedocking. A circular centering incline 54 facing away from the base 40 is connected to the ramp 52 toward the upper side 53 of the adapter ring 49. The pistol nozzle 15 is centered by the incline 54 when introduced into the docking element 4. The adapter ring 49 possesses several steps 55, incorporated from the upper side 53, into which clip hooks 57 of elastic clip arms 56 engage. The clip arms are disposed on the periphery of the base 40. The adapter ring 49 is also secured axially in this way.

An axial recess 59 is arranged on the underside 58 of the ring carrier element 8 in which a leg 60 of a "leg" or torsion spring 61 is clamped. The leg spring 61 is concentrically wound around a shaft 64 extending along the swivel axis 62 of a cover 63 of a fuel tank closure, and is braced with its other leg 65 on the underside 66 of the cover 63. The cover 63 and the shaft 64 are kept reliably serviceable within the filling tube 1 near its upper mouth opening 2 arranged on the ring carrier element 8. For this purpose, the shaft 64 is installed directly on the edge 67 of the cover 63 in a construction space-saving manner. The middle axis of the shaft 64 forms the swivel axis 62 of the cover 63. The swivel axis 62 consequently runs in a space-saving manner (owing to the omission of connection construction components between swivel axis 62 and cover 63) tangentially toward the basically extensive circular edge 67 of the cover 63.

The cover 63 possesses a collecting trough 68 for condensation and/or rain water which is constructed near the edge toward the swivel axis 62 in the upper side 69 of the cover 63. A drainage channel running within the cover edge 67 leads off from the bottom 70 of the collecting trough 68 which discharges through a tube connection. A tube-like drainage conduit 71, of silicone, for example, is put on the connection. The other end 72 of the conduit 71 is installed fluid-tight on a connection pipe 74. The connection pipe 74 is constructed as a "tube turn" or elbow tube and mounted on the interior 73 of the filling tube 1. The filling tube 1 has an outlet 75 at the attachment end 76 of the connection pipe 74 through which the accumulated water can exit from the tank.

A nose-like cam disk 77 is "tip-stretched" or extends from the upper side 69 of the cover 63 and connects to the collection trough 68 facing away from the swivel axis. The cam disk 77 can be fastened on the cover 63 in the usual manner. The cam disk 77 has a guide surface 78 facing the swivel axis 62 which is concavely arched. At the same time, the curve of the arch vault 79 in the end area 80 near the swivel axis continuously passes over into the curve of the connection wall 81 of the collection trough 68 of the cover 63. The cam disk 77 has an elevated domelike end area 82 at the point furthest removed from the swivel axis. This end area results from the arching 79 of the guide surface 78. Other curve forms of the guide surface 78 which extend from the elevated end region 82 to the swivel axis 62 with diminishing height of the cam disk 77 are also conceivable.

The arrangement of the collection trough 68, its continuous transition to the guide surface 78, and the conduit guide over the drain formed by the drainage channel and the drainage conduit 71 toward the outside assure that water cannot accumulate at any time. On account of its weight, which counteracts the closing force of the cover 63 and consequently promotes opening, and its tendency to leak past the circular edge 67 of the cover 63, accumulated water would otherwise reach the tank interior. Thus, the reliability of the closure for keeping undesired penetration of contaminating substances, or substances impairing the fuel in the tank in any way, is basically assured. Furthermore, a wetting by water of an elastomer flat gasket ring or seal 83 applied on the edge 67 on the upper side 69 of the cover 63, especially by gluing, is prevented, so that tightness of the closure and, consequently, a secure closure is guaranteed. The discharge device described likewise ensures that, upon opening the cover 63 by a fill pipe 14 of the pistol nozzle 14, water is prevented from penetrating unimpeded into the tank.

In the closed position of the installed cover 63 depicted, the end area 82 of the guide surface 78 removed from the swivel axis occupies its geodetically highest position. This end area is set at a distance from the nearest edge area 84 on the side 85 of the cover 63 facing away from the swivel axis toward the swivel axis 62. This distance is selected or dimensioned such that the fill pipe 14 initially engages only with a peripheral section 86 of its face 87 on the end area 82 of the guide surface 78 when it is introduced into the filling tube 1. The height of the end area 82 removed from the swivel area 78 of the guide surface is dimensioned such that the swivel radius of the end area 82 in relation to the swivel axis 62 of the cover 63 is smaller than that of the adjacent edge area 84 of the cover 63 in the closed position which is removed from the swivel axis at the site of the passage 13 of the ring carrier element 8, and consequently of the filling tube 1 of the radially bounding interior wall 88 of the ring carrier element 8. In this way, a clamping-free swivelling of the cover 63 and a reliable, secure closure are assured. In addition, the fill tube 14 can be introduced unimpeded into the filling tube 1.

Owing to its arrangement, the cover 63 together with shaft 8, (which can be activated manually as well as by the tank robot) can be retrofitted in a simple manner in traditional tank filling tubes, and be interchanged if damaged. Because the cover is fastened on the ring carrier element 8, a basic simplification of placement of the cover 63 in the filling tube 1 results. The arrangement of the cover 63 near the mouth opening 2 of the filling tube 1 which results from this makes possible a space saving reduction of the fill pipe length and a reduction of the insertion time of the fill pipe 14. Less time, therefore, is consumed in filling up a fuel tank.

In FIG. 1, the cover 63 is shown in the closed position and lies, under spring force directed against the movement of insertion of the fill pipe 14 by the leg spring 61 in a prestressed state, in a sealing position through the elastomer seal 83 on the underside 58 of the ring carrier element 8. The fill pipe 14 is introduced into the passage 13 so that it lies with its peripheral section 86 of the face 87 on the end area 82 of the guide surface 78 of the cam disk 77. In the fitting position of the cover 63 described, the swivel axis 62 is arranged outside the clear diameter of the central passage 13 of the filling tube 1 in the tank, and lies perpendicular to a plane extending from the central axis 89 of the passage 13.

Assembly of the device of the invention and the manner of mounting the device on the filling tube 1 is depicted below. First, the docking element 4 itself is assembled in that the adapter ring 49 with the step 50 is set upon the shelf 48 of the ring bearing 46 of the basis 40 while bending back the clip arm 56. After this, the clip arms 56 are released, so that they then engage with the clip hook 57 in the steps 55 of the adapter ring 49 while forming a clip connection between the adapter ring 49 and the base 40.

The compression spring 25 is likewise separately installed on the ring carrier element 8 and is supported on the upper side 26 of the ring connection 17. Thereafter, the locking ring 18 is mounted on the ring carrier element 8 such that its retaining bars 20 engage into the longitudinal grooves of the ring carrier element 8. The locking ring 18 thereby lies within the recesses 24 of the bayonet arms 23 on the compression spring 25. Furthermore, the coupling ring 28 is now positioned on the ring carrier element 8 which coaxially surrounds the locking ring 18, saving construction space, and stands on its bayonet arms 23, so that the catch segments 29 of the coupling ring 28 (viewed in a peripheral direction) are situated between the bayonet arms 23. The ring carrier element 8, in the face 12 of which an O-ring 41 for gas-tight sealing in relation to the docking element 4 is placed, is then screwed into the inner thread 7 of the ring connection 6 of the docking element 4 with its upper end 9 which bears the outer thread 10. Subsequently, the cover, provided with elastomer seal 83, shaft 64 and leg springs 61, is fastened on the ring carrier element 8 by clamping the leg springs 61 in the recess 59 of the ring carrier element 8. The drainage conduit 71 is then put on the tube connection of the cover 63; the other end 72 of the conduit 71 is already liquid-tightly mounted on the connection pipe 74. Care should be taken at this point to assure that the length of the drainage conduit 71 is long enough that it projects from the filling tube 1 so as to be easily handled. The assembly of the device is now concluded.

After assembly has taken place, the device is installed on the filling tube 1, so that the ring carrier element 8 with the cover 63 is passed through the mouth opening 2 of the filling tube 1 until the docking element 4 lies on the underside on the edge 3 of the filling tube 1. In passing through, the bayonet arms 23 of the locking ring 18 are pushed through appropriate recesses provided on the edge 3 of the filling tube 1. The docking element 4 is then rotated clockwise, so that first the shoulders 33 of the coupling ring 28 reach into the bayonet recesses of the edge 3 of the filling tube 1 and lie with their faces 34, 35 on the recess ends with but little play. The coupling ring 28 is therewith secured against torsion. By rotating the docking element 4, the ring carrier element 8 is rotated along with it by the screw connection. Owing to the fact that the locking ring is connected securely for rotation with the ring carrier element 8, the locking ring 18 is likewise rotated along with the rotation of the docking element 4. If the docking element 4 is rotated further in the same peripheral direction, then the locking ring 18 moving peripherally relative to this comes into contact with the sides 31 oriented counterclockwise and forming the catch rims owing to the now rotation fast position of the coupling ring 28. In this way, a defined catch for the locking ring 18 is formed so that an excessively strong clamping of the bayonet arms 23 in the corresponding grooves of the filling tube 1, which for many persons would prevent a deliberate removal of the device, is avoidable. The locking ring 18 is from now on situated in its locking position. With a further clockwise rotation of the docking element 4, the stop lugs 37 of the docking element 4 stop in the stop grooves 36 of the coupling ring 28, so that the docking element 4 is secured torsion-fast, and a secure refuelling is subsequently assured. It should be noted in this connection that stop lugs 37 can also be installed on the coupling ring 28 and stop grooves 36 can also be positioned on the docking element 4 as an alternative.

For removing the device, the fixation of the stop lugs 37 in the stop grooves 36 should first be released. This takes place manually by an axial motion against the spring force of the compression spring 25, which is pressed together axially in connection with the bayonet connection of the locking ring 18 with the edge 3 of the filling tube 1. After releasing the stop connection, the docking element 4 is rotated counterclockwise, so that the bayonet arms 23 of the locking ring 18 release from the clamp and are swivelled until they lie on the catch rims 30 of the catch segments 29 pointing clockwise. Appropriately, this catch position is selected such that the bayonet arms 23 are placed under the shoulders 33 of the coupling ring 28. In this way, the shoulders 33 of the coupling ring 28 and the bayonet arms 23 can be passed or pushed through and out of the recesses of the filling tube edge 3 without further rotation of the docking element 4. The refuelling device, therefore, can be removed from the filling tube 1 in a simple way. For the purpose of better handling, moreover, a handle can be arranged above on the docking element 4 for manual removal of the fixation and rotation.

The foregoing disclosure has been set forth merely to illustrate the invention and is not intended to be limiting. Since modifications of the disclosed embodiment incorporating the spirit and substance of the invention may occur to persons skilled in the art, the invention should be construed to include everything within the scope of the appended claims and equivalents thereof.

What is claimed is:

1. A device for robotizable refuelling of a vehicle comprising:

a docking element which can be installed on a filling tube of a vehicle fuel tank for accommodating a pistol nozzle, in which the piston nozzle can be locked in an axial and peripheral direction, and which has a central passage opening for a fill pipe of the piston nozzle, a hollow, cylindrical ring carrier element fastened underneath the docking element and provided with a central passage, a locking ring held, without torsional movement but axially movable, on the carrier element, a compression spring braced between an underside of the locking ring and a connection of the ring carrier element, radially projecting bayonet arms on the locking ring by which the device can be installed on an inlet edge of the filling tube, the edge of the filling tube being provided with recesses for guiding the bayonet arms through to provide a bayonet closure, a coupling ring borne by the ring carrier element arranged torsion fast on the upper side of the locking ring, and catch elements, constructed so as to correspond to each other, defined on an upper side of the coupling ring and on an underside on the docking element, with which the docking element can be engaged with the coupling ring.

2. The device according to claim 1, wherein the coupling ring possesses diametrically opposed shoulders which are arranged within the recesses of the edge of the filling tube in a fitting position of the docking element.

3. The device according to claim 1, wherein the catch elements include at least one stop lug rigidly mounted on the docking element and a corresponding stop groove incorporated into the coupling ring.

4. The device according to claim 1, wherein the coupling ring has two catch segments projecting toward the tank interior on the underside of the coupling ring which lie diametrically opposite each other and having sides pointing in a peripheral direction to form stop rims for the bayonet arms of the locking ring.

5. The device according to claim 4, wherein the catch segments are located below a stop groove forming the catch element of the coupling ring.

6. The device according to claim 1, wherein the locking ring has retaining bars extending radially inward which engage in longitudinal grooves of the ring carrier element.

7. The device according to claim 1, wherein the coupling ring coaxially surrounds the locking ring and lies on said bayonet arms.

8. The device according to claim 3, wherein the coupling ring has two diametrically opposed stop grooves in which corresponding stop lugs arranged on the docking element can be engaged.

9. The device according to claim 1, wherein the ring carrier element includes an outer thread on its end facing the docking element, with which it is screwed gas-tight into a corresponding inner thread defined on the docking element.

10. The device according to claim 1, wherein the docking element includes a bipartite stop receptacle in which corresponding locking elements of the pistol nozzle can be fixed for interlocking which takes place in an axial and radial direction on the docking element, a lower part of the stop receptacle being formed by a base near the filling tube, and further comprising an adapter ring forming an upper part of the stop receptacle positioned radially and axially secure from loss on the base.

11. The device according to claim 10, wherein the adapter ring has an inclined ramp facing the base on its inside.

12. The device according to claim 10, and further comprising clip arms defined on a periphery of the base and axially holding an upper side of the adapter ring to retain the adapter ring on the base.

13. A device for robotizable refuelling of a vehicle comprising:
- a docking element which can be installed on a filling tube of a vehicle fuel tank for accommodating a pistol nozzle, in which the piston nozzle can be locked in an axial and peripheral direction, and which has a central passage opening for a fill pipe of the piston nozzle,
- a hollow, cylindrical ring carrier element fastened underneath the docking element and provided with a central passage,
- a locking ring held, without torsional movement but axially movable, on the carrier element,
- a bayonet closure provided between the locking ring and the filling tube of the vehicle, and
- a coupling ring borne by the ring carrier element arranged torsion fast on the upper side of the locking ring and engaging the docking element.

14. The device according to claim 13, wherein the coupling ring possesses diametrically opposed shoulders which are arranged within recesses defined in the filling tube in a fitting position of the docking element.

15. The device according to claim 13, wherein the coupling ring has two catch segments projecting toward the tank interior on the underside of the coupling ring which lie diametrically opposite each other and having sides pointing in a peripheral direction to form stops for the locking ring.

16. The device according to claim 13, wherein the catch segments are located below a stop groove of the coupling ring.

17. The device according to claim 13, wherein the locking ring has retaining bars extending radially inward which engage in longitudinal grooves of the ring carrier element.

18. The device according to claim 13, wherein the coupling ring coaxially surrounds the locking ring.

19. The device according to claim 13, wherein the ring carrier element includes an outer thread on its end facing the docking element, with which it is screwed gas-tight into a corresponding inner thread defined on the docking element.

* * * * *